CODE CONVERTER
Filed Jan. 5, 1954
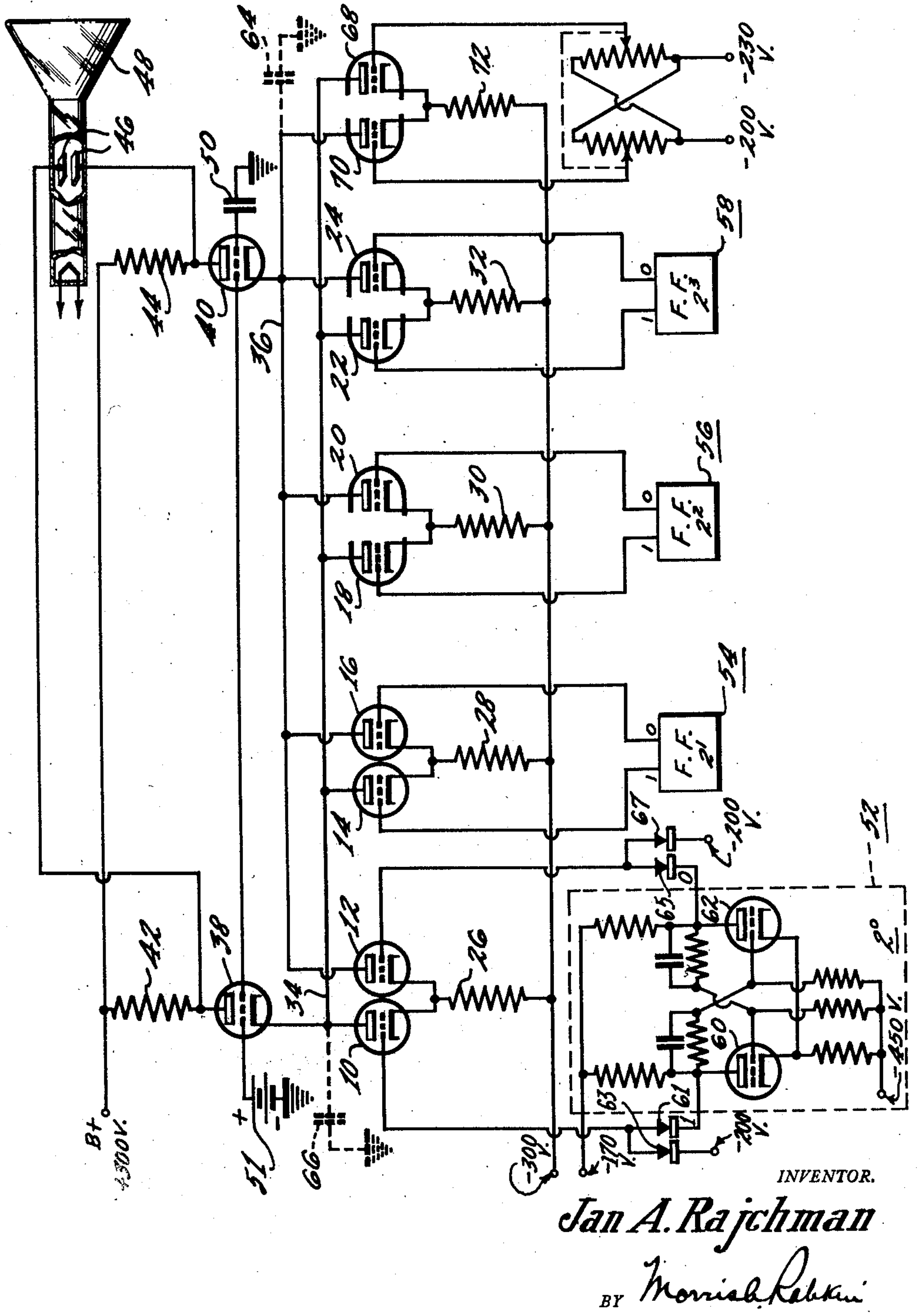
INVENTOR.
Jan A. Rajchman
BY Morris A. Rebkin
ATTORNEY United States Patent Office 2,820,140
Patented Jan. 14, 1958

2,820,140

CODE CONVERTER

Jan A. Rajchman, Princeton, N. J., assignor to Radio Corporation of America, a corporation of Delaware Application January 5, 1954, Serial No. 402,385

7 Claims. (Cl. 250—27)

This invention relates to information handling instruments and to coding devices used therein; and particularly to a circuit for converting information encoded in digital form to an analogue form.

In large scale information handling systems, the information is frequently encoded in digital form to attain versatility in the apparatus required, precise results, and high-speed operation. The binary system is one common digital system used for handling numbers and other forms of information. When that system is used, the storage devices and other components of information handling systems are provided with two operating conditions; the existence of one or the other condition represents one or the other of the binary digits one and zero. Common examples of such binary system devices are conduction and non-conduction in an electron tube, opposite conditions of magnetic polarity in a magnet, or a perforation or the absence of a perforation in a tape.

It is frequently necessary or desirable to use, in information handling systems, instruments which respond to the characteristics of a signal such as its magnitude and not to the binary coded form of signal. For example, the movement of a pointer across a meter dial or the displacement of an electron beam in a cathode ray tube may be dependent on the magnitude of a voltage or current signal. Thus, such movement or displacement may be used to provide direct representations of information where the signals applied have a magnitude proportional to the information, i. e. are in analogue form. The signals from digital devices are usually in the form of on-off signals; that is, positive and negative signals or the presence or absence of pulses. Therefore, digital signals are not suitable for directly driving an analogue device, such as a cathode ray tube in which a voltage or current is required depending on whether electrostatic or magnetic deflection is used. In order to display digital information on a kinescope or to control the deflection of an electron beam in a cathode ray tube, it is desirable to convert digital signals to an analogue voltage or current.

One method of achieving such a digital-to-analogue conversion is to parallel a number of current regulators equal to the number of on-off signals of the digital code. The current regulators may be simple cathode followers or some type of amplifier with greater than unity gain using a plurality of tubes. Each current regulator is turned on or off by the associated digital signals, and its current output is made proportional to the significance of the associated digit by suitable selection of the magnitude of the cathode resistor. For example, in a pure binary code the amplitudes of the currents would be in the ratios of 1, 2, 4, 8, 16, 32 etc. In a binary coded decimal system, the currents would be in the ratios of 1, 2, 4, 8 within each decade; and for two decades, in the ratios 1, 2, 4, 8, 10, 20, 40, 80. Another example of decimal coding used frequently is 1, 2, 4, 2.

Usually the paralleling of current regulators is accomplished by paralleling the anodes of the output regulator tubes. As a result of the paralleling of the anodes, the anode swing on each of the regulator tubes is the same, causing several detrimental effects. The tube delivering the least significant amount of current has to deliver for accuracy a standard current in the face of a very large anode swing, for example, one unit in the face of a change of 80+40+20+10+8+4+2=164 units for a two decade binary coded decimal system. This large voltage swing means that the plate dissipation of that tube is very much larger than it would be if the anode swing were due to the tube itself and not all other parallel tubes. As a result larger tubes are needed to deliver the additional power required by the large anode swing. Also exact current regulation is difficult to attain where there is such a large anode voltage swing. Furthermore, the electrostatic capacity of the paralleled anodes becomes so large that tubes that can deliver large currents are required to obtain high speed of operation.

In order to avoid the effect of such a large common anode voltage swing, in some magnetically deflected cathode ray tube systems deflecting yokes are subdivided into independent parallel windings. Each parallel deflecting winding is fed by one or more independent regulator tubes. This method of subdividing the yokes to solve the problem is expensive; furthermore, this method cannot be applied where electrostatic deflection of the cathode ray tube is employed.

An object of this invention is to provide a simple and improved digital-to-analogue converter without the disadvantages of the prior art.

Another object of this invention is to provide a digital-to-analogue converter circuit employing a plurality of current regulator tubes in which the voltage swing of the paralleled anodes is substantially eliminated or greatly reduced.

Another object of this invention is to provide an improved digital-to-analogue converter circuit in which reasonably small regulator tubes may be used to provide a sufficiently large output.

Another object of this invention is to provide a digital-to-analogue converter circuit in which the output is more accurate than heretofore.

Another object of this invention is to provide a digital-to-analogue converter circuit that has a high speed of operation and permits flexibility of design.

In accordance with this invention a grid-controlled electron tube is connected in series with the parallel set of current regulator tubes, the cathode of the series tube being connected to the paralleled regulator tube anodes. The series tube grid is at a fixed D. C. (direct current) potential and grounded for A. C. (alternating current). The series tube anode carries the useful load in the form of an anode resistor for a voltage output, and in the form of a deflection coil for a magnetically deflected cathode ray tube. With the grid to cathode bias of the series tube sufficiently negative, there is no grid current in the series tube. Therefore, the series tube cathode and anode current are equal and the current in the series tube anode load is the total anode current of the paralleled regulator tubes. The paralleled anodes swing over only a very small voltage range which is the series tube cathode swing from just above cutoff through the range of substantially no grid current. Although the voltage swing at the paralleled anodes is small, a large useful voltage swing is obtained from the series tube anode. The capacitance of the element swinging in a large voltage range is only that of the series tube anode circuit which is much smaller than the capacitance of the regulator tube paralleled anodes.

The foregoing and other objects, the advantages and novel features of this invention as well as the invention itself both as to its organization and mode of operation may be best understood when read together with the accompanying drawing, in which like reference numerals refer to like parts, and which is a schematic circuit diagram of an embodiment of this invention.

In the drawing, a push-pull arrangement is shown for illustrative purposes. Four pairs of grid-controlled electron tubes 10—24 are used as current regulator tubes. Each pair of tubes has a separate common cathode resistor 26, 28, 30, 32, the low voltage end of which is connected to the negative terminal of a suitable D. C. voltage supply. The zero voltage terminal of this D. C. supply is connected to a common conductor indicated by the conventional ground symbol. The anodes of the first regulator tubes 10, 14, 18, 22 of each pair are connected in parallel to a first bus 34, and all the second regulator tube 12, 16, 20, 24 anodes are connected in parallel to a second bus 36. The buses 34, 36 are respectively connected to the cathodes of first and second series tubes 38, 40. Each series tube 38, 40 has an anode load resistor 42, 44 connected to the positive terminal B+ of the D. C. voltage supply. The series tube 38, 40 anodes are connected to opposed deflection plates 46 of a cathode ray tube 48. Both series tube 38, 40 control grids are returned to ground through a single bypass capacitor 50. The series tube 38, 40 control grids are also connected to the positive side of a battery 51, the negative side of which is returned to ground. With the voltage levels specified in the drawing by way of illustration, the series tube 38, 40 control grids may be connected directly to ground and the biasing battery 51 omitted. The series tubes 38, 40 operate so that substantially no grid current is drawn over the voltage swing of the series tube 38, 40 cathodes.

Separate bistable multivibrator circuits 52, 54, 56, 58 may be used to apply the digital signals to the control grids of the regulator tubes 12, 16, 20, 24. A first bistable multivibrator 52 circuit is shown in detail by way of example. The other multivibrators 54, 56, 58 may be identical. Each multivibrator includes first and second grid-controlled tubes 60, 62 whose anodes and control grids are cross-coupled through resistors. Only one of the multivibrator tubes 60, 62 is conducting at any time. The first tube 60 is conducting, and its anode is at a relatively low voltage level to register the digit zero. The first tube 60 is cut off and its anode is at a relatively high voltage level to register the digit one. Each first regulator tube 10, 14, 18, 22 control grid is connected to the anodes of separate isolating and clamping diodes 61, 63. The cathode of the isolating diode 61 is connected to the anode of the first tube 60 of the associated multivibrator circuit 52—58. Each second regulator tube 12, 16, 20, 24 control grid is connected to anodes of separate isolating and clamping diodes 65, 67. The isolating diode 65 cathode is connected to the second tube 62 anode of the associated multivibrator circuit 52—58. The clamping diode cathodes are connected to a negative direct voltage that determines the maximum voltage to which the regulator tube grids can rise. The difference in voltage at the multivibrator tube 60, 62 anodes is sufficient to render one of the regulator tubes of each pair conductive and the other tube cut off.

The cathode resistor 26—32 of each current regulator stage is adjusted to be inversely proportional to the numerical value of the digit represented by the associated multivibrator circuit 52—58. Thus, for the binary code in which the four stages 52—58 represent respectively the digits 1, 2, 4, and 8, the common cathode resistors 26—32 would be respectively proportional to 1, ½, ¼, and ⅛. The current through each regulator tube 10—24, due to its cathode follower action, is inversely proportional to the value of its common cathode resistor 26—32 respectively and, therefore, directly proportional to the digit represented by that stage.

In operation, each first regulator tube 10, 14, 18, 22 conducts when the associated multivibrator 52—58 respectively registers a one and is cut off when the associated multivibrator 52—58 respectively registers a zero. Correspondingly, each second regulator tube 12, 16, 20, 24 conducts when the associated multivibrator circuit 52—58 respectively registers a zero and is cut off when it registers a one. Thus, the current through the first bus 34, which is the sum of the currents through the first regulator tubes, 10, 14, 18, 22, is the analogue of the numerical values $2^{\circ}$–$2^3$ represented by the multivibrator circuits 52, 58 registering a one. The current through the second bus 36 is the analogue of the numerical values $2^{\circ}$—$2^3$ represented by the multivibrators 52—58 registering a zero. The two bus 34, 36 currents are in push-pull relationship about a reference current which is equal to half the sum of the two currents. These respective bus currents are also the currents through the first and second series tube anode resistors 42, 44. Therefore, the voltage drops across the anode resistors 42, 44 are the desired push-pull analogue voltages for controlling the deflection of the cathode ray tube 48. Where magnetic deflection is used, the series tube anode resistors may be replaced by the coils of a deflection yoke (not shown) through which the B+ supply and push-pull currents pass.

The voltages at the first and second buses 34, 36 remain substantially constant, varying only as the series tube 38, 40 cathodes. The voltage swing of the series tube 38, 40 cathodes is from just above cutoff through the range of substantially no grid current. However, there is a large voltage swing at the series tube 38, 40 anodes for driving the deflection plates 46 of the cathode ray tube 48. The series tubes 38, 40 may be considered as amplifiers that isolate the paralleled current regulator anodes from the voltage fluctuations of the useful load. In addition, there is a degenerative feedback action at the series tube cathodes. Each series tube 38, 40 may be considered as a cathode follower tube, and the paralleled regulator tubes 10—24 and resistors 26—32 may be considered as the cathode impedances of the series tubes.

As a result of the substantially constant voltage at the first and second buses 34, 36, fairly large capacitances 64, 66 (shown in broken lines) can be tolerated at these points without adverse effects. For example, the regulator tubes 10—24 can be physically far away from the series tubes 38, 40 and connected to them through a long coaxial cable (not shown). Being able to use a cable connection at the buses 34, 36 is important for it may not be possible to put all the regulator tubes 10—24 close to the cathode ray tube 48. The capacitance of such a cable does not substantially impede high-speed operation because of the small voltage swing at the buses 34, 36.

Four current regulator stages are shown corresponding to a digital code having four significant digits. However, any number of stages may be used. The usefulness of the circuit in holding the paralleled anode voltages substantially constant increases considerably as the number of stages increases.

Centering control of the cathode ray tube 48 deflection may be obtained with the circuit of the invention in an exceptionally simple and desirable way. Two additional regulator tubes 68, 70 are provided and connected in push-pull. The additional tube 68, 70 anodes are respectively connected to the first and second buses 34, 36. A common cathode resistor 72 is connected between the additional tube 68, 70 cathodes and the negative terminal of the D. C. supply. The additional tube 68, 70 control grid voltages are varied by ganged potentiometers, as shown, connected between negative direct voltages equal to the tube-conductive and tube-cutoff voltages of the other regulator tube 10 to 24 grids. The current through each of the buses 34, 36 is varied in accordance with the associated potentiometer adjustment to provide a centered deflection voltage. The additional currents drawn by the centering tubes 68, 70 have substantially no effect on the voltage of the paralleled regulator tube anodes.

The circuit may also be used where a single ended output is desired. Only one set of parallel regulator tubes and a single series tube are connected in the manner described above, as will be apparent to those skilled in the art from the foregoing description.

It is evident from the above description of this invention that a digital-to-analogue converter circuit is provided which produces a large accurate output, which permits the use of regulator tubes smaller than those of prior circuits, that may be distantly located from the utilization device, and that permits high speed of operation and greater flexibility in design.

What is claimed is:

1. Apparatus for converting signals in a digital code form to signals in analogue form comprising a plurality of first electron control devices each having anode, cathode and control electrodes, separate digitally-operating means for receiving said digital code signals and for varying the anode-cathode current of each of said first devices in accordance with said digital code, a second electron control device having anode, cathode and control electrodes, means coupling said first device anodes together and to said second device cathode so that the total anode current of said first devices flows through said second device, and output means coupled to said second device anode.

2. An electronic circuit comprising a plurality of first electron control devices each having anode, cathode and control electrodes, a plurality of impedance elements each coupled to the cathode of a different one of said devices, the magnitudes of said impedance elements being in accordance with a digital code, input means coupled to said control devices for applying digital code signals thereto, a second electron control device having anode, cathode and control electrodes, a load impedance coupled to said second device anode for deriving an output signal, and means coupling said first device anodes in parallel to said second device cathode so that the total anode current of said first devices flows through said second device.

3. An electronic circuit for code conversion comprising at least three first electron control devices each having anode, cathode and control electrodes, at least three impedances each coupled to the cathode of a different one of said devices, input means coupled to said control devices for applying code signals thereto, a second electron control device having anode, cathode and control electrodes, a load impedance coupled to said second device anode, and means coupling said first device anodes together and to said second device cathode so that the total anode current of said first devices flows through said second device.

4. Apparatus for converting signals in a digital code form to signals in analogue form comprising a plurality of first electron control devices each having anode, cathode and control electrodes, a plurality of impedance elements each coupled to the cathode of a different one of said devices and having a different magnitude in accordance with said digital code, input means coupled to said control electrodes for applying digital code signals thereto, second and third electron control devices each having anode, cathode and control electrodes, a load impedance coupled to said second device anode, adjustable means for varying said third device control electrode voltage, and means coupling said first and third device anodes in parallel to said second device cathode so that the total anode current of said first and third devices flows through said second device.

5. Apparatus for converting signals in a digital form to signals in analogue form comprising a plurality of first electron discharge tubes each having an anode, cathode and control grid, a plurality of resistors each coupled to the cathode of a different one of said tubes and having magnitudes in accordance with said digital code, a second electron discharge tube having an anode, cathode and control grid, a load impedance coupled to said second tube anode, means connecting said first tube anodes in parallel to said second tube cathode so that the total anode current of said first tubes flows through said second tube, and means for applying an operating potential to said load impedance.

6. Apparatus for converting signals in a digital form to signals in analogue form comprising a plurality of first electron discharge tubes each having an anode, cathode and control grid, a plurality of resistors each coupled to the cathode of a different one of said tubes and having magnitudes in accordance with said digital code, a second electron discharge tube having an anode, cathode and control grid, a load impedance coupled to said second tube anode, means connecting said first tube anodes in parallel to said second tube cathode so that the total anode current of said first tubes flows through said second tube, means for applying a constant direct voltage to said second tube control grid, bypass capacitor means coupled to said second tube control grid, and means for applying an operating potential to said load impedance.

7. Apparatus for converting signals in a digital code form to signals in analogue form comprising a plurality of first electron discharge tubes arranged in two groups, each of said tubes having an anode, cathode and control grid, a plurality of resistors coupled to the cathodes of respective pairs of said tubes, each of said pairs having one tube from one of said groups and the other tube from the other of said groups, and said resistors having magnitudes dependent upon said digital code, at least some of said resistor magnitudes being different, two additional electron discharge tubes each having an anode, cathode and control grid, separate load resistors connected to said additional tube anodes, a utilization device connected to said additional tube anodes, and separate means respectively connecting in parallel said first tube anodes of said one and the other of said two groups of tubes to the cathodes of the one and the other of said two additional tubes.

References Cited in the file of this patent

UNITED STATES PATENTS

| | | |
|---|---|---|
| 2,171,629 | Lindenblad | Sept. 5, 1939 |
| 2,474,266 | Lyons | June 28, 1949 |
| 2,486,391 | Cunningham | Nov. 1, 1949 |
| 2,572,792 | White | Oct. 23, 1951 |
| 2,582,596 | MacRae | Jan. 15, 1952 |
| 2,591,007 | Rench | Apr. 1, 1952 |
| 2,615,127 | Edwards | Oct. 21, 1952 |
| 2,632,046 | Goldberg | Mar. 17, 1953 |
| 2,644,111 | Desch | June 30, 1953 |
| 2,644,112 | Desch | June 30, 1953 |
| 2,653,231 | Cooke-Yarborough | Sept. 22, 1953 |
| 2,658,139 | Abate | Nov. 3, 1953 |
| 2,661,398 | Cooper et al. | Dec. 1, 1953 |
| 2,683,805 | Fyler | July 13, 1954 |